Dec. 4, 1928.

E. HIBBERT 1,694,260

MANUFACTURE OF TIRES FOR MOTOR VEHICLES

Filed Dec. 3, 1926   2 Sheets-Sheet 1

Inventor
Ernest Hibbert
per
Attorney

Dec. 4, 1928.                                                                                    1,694,260
E. HIBBERT
MANUFACTURE OF TIRES FOR MOTOR VEHICLES
Filed Dec. 3, 1926          2 Sheets-Sheet 2

Inventor.
Ernest Hibbert
per
James L. Norris
Attorney.

Patented Dec. 4, 1928.

1,694,260

UNITED STATES PATENT OFFICE.

ERNEST HIBBERT, OF GOULBURN, NEW SOUTH WALES, AUSTRALIA, ASSIGNOR TO HIBBERT PNEUMATIC CELL TYRE COMPANY LIMITED, OF GOULBURN, NEW SOUTH WALES, AUSTRALIA, A COMPANY OF NEW SOUTH WALES, AUSTRALIA.

MANUFACTURE OF TIRES FOR MOTOR VEHICLES.

Application filed December 3, 1926, Serial No. 152,468, and in Australia April 17, 1926.

This invention relates to resilient tires for motor and other vehicles and has for its objects to provide a durable and efficient tire which will eliminate the usual inner pneumatic tube while retaining a great amount of resiliency, the cost of the manufacture being light and the tire to all intents and purposes puncture proof. Furthermore, such a tire is practically unburstable and there is a minimum of air or rubber friction. It will thus be seen that "blow-outs" are a practical impossibility, thus preventing loss of life, and a car or vehicle equipped with tires made according to this invention does not require to carry spare tires or tubes.

According to the invention I form a rubber core in annular parts or halves which are semi-vulcanized in suitable moulds. In each half of the core I provide recesses or cells preferably of tubular or cylindrical section, and positioned transversely to the tread, the recesses in one half being adapted to coincide with those in the other half, and so positioned that they are in staggered plan, either to a line taken from the axis of the wheel, or to circumference lines on the vertical or inner faces of the halves. The halves are then brought together and vulcanized to form the core, compressed air or gas at the required pressure being confined in the cells.

Before the said halves are brought together I preferably interpose an annular division member of equal external diameter of the core, to be placed between the halves. The said division member or piece is of flat sheet rubber, or it may be moulded and semi-vulcanizable with small transverse rubber pins thereon having concave ends. These pins correspond in number to the recesses in the halves and are so positioned on either side of the division piece as to coincide with and fit in the said recesses.

The innermost ends of the recesses or cells in the halves are preferably rounded and in them may be placed a wad of unvulcanizable rubber, so that, when the halves of the core are placed together and vulcanized, an hypodermic needle or like instrument may be inserted and air or gas injected into each cell, the unvulcanizable rubber wad closing the small hole made by the needle when it is withdrawn. Between the halves is placed the division piece, the three pieces being properly positioned. The recesses or cells are then filled with compressed air or gas from a tank, or through suitably located air inlet jets, during the process of closing or the bringing together of the inner or vertical faces, and the whole clamped and vulcanized into an homogeneous mass, thereby forming the completed tire core, which may be bound with treated fabric or other suitable material, if desired.

In some cases I may build the tire cover upon the core using the straight side rim as a base into which the fabric or cord will be wired and the whole vulcanized together.

Alternatively the core may be placed in a standard cover and vulcanized or solutioned into position.

In a modified form of the invention, I semi-vulcanize the halves of the core in suitable moulds and provide the cells or recesses therein as hereinbefore described, and before joining the halves together I interpose a cell band comprised of two sheets of rubber provided with air or gas filled pockets which are correspondingly formed to the shape and size of the cells in the halves of the core into which they are inserted.

But in order that my invention may be more clearly comprehended, I will now refer to the accompanying drawings in which Figure 1, is a cross sectional perspective view of a core completed and placed in its cover, while Figure 2 is a section through the core with the three main parts separated.

The same reference numerals indicate like parts throughout the drawings.

According to the invention I first form the core in annular halves 6 and 7 which are semi-vulcanized in suitable moulds. In each half core, recess, as at 8—8, preferably of cylindrical shape, are positioned transversely to the tread. The recesses 8 in one half of the core, coincide with those of the other half and are so positioned that they are in staggered plan either to a line taken from the axis of the wheel, or to the circumference lines on the vertical or inner faces of the half cores.

A circular division piece 9 having a thickness of approximately $\tfrac{3}{16}''$ (three sixteenths of an inch) and of equal external diameter to the core is placed between the halves. The said division piece 9 is of flat sheet rubber, or it may be moulded and semi-vulcanized with small rubber pins as 10—10 thereon having concave ends 11—11. The said pins 10 have a protrusion of approximately ¼ (one quarter of an inch) from the vertical faces of the circular division piece 9, and the pins correspond in number to the recesses 8 in the core halves, being so positioned on either side of the division piece 9 as to coincide with the recesses 8 in the halves.

Figure 1:
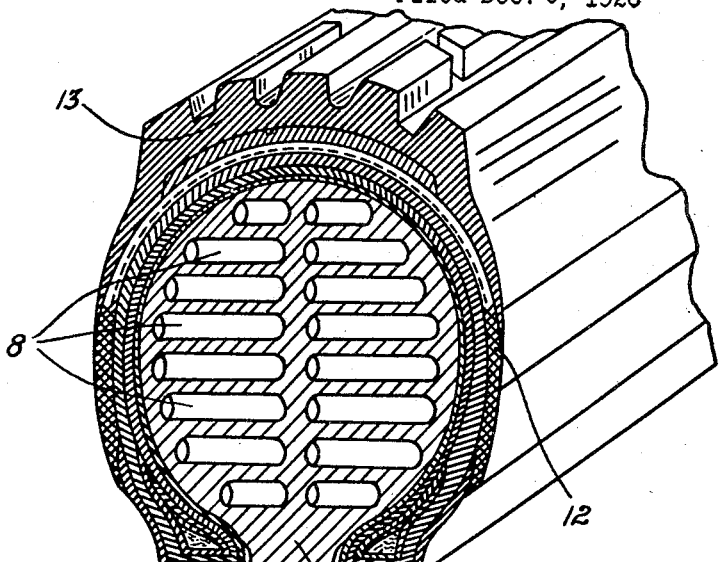

The half cores 6 and 7 and the circular division piece 9 either with or without the lateral pins 10 are brought together in the presence of air or gas under pressure which is forced into the recesses 8 and allows a complete core to be constructed and vulcanized as illustrated in Figure 1 in which a tire cover 12 provided with the usual tread surface 13 has been placed over the complete core 15.

Figure 4:
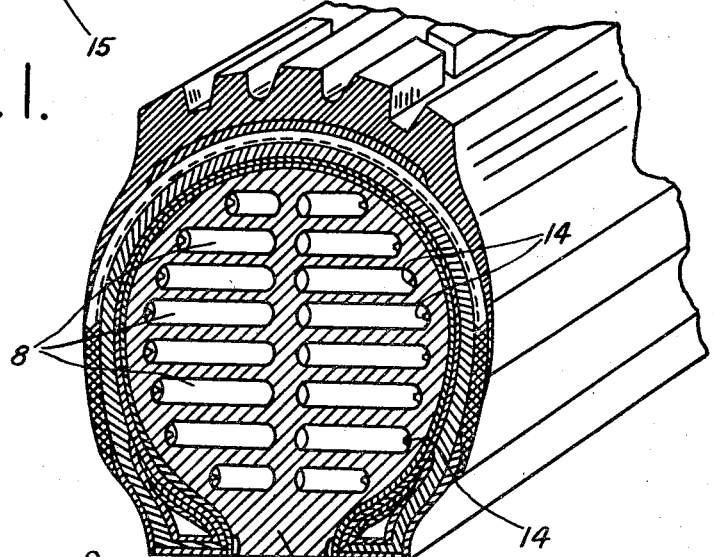
Figure 4 is a view similar to Figure 1, view of a modification in which the outer ends of each cell are provided with a small piece or wad of unvulcanizable rubber whereby air may be inserted into the cell by means of a hypodermic needle and so prevent the escape of air on the needle being withdrawn.
Figure 5:
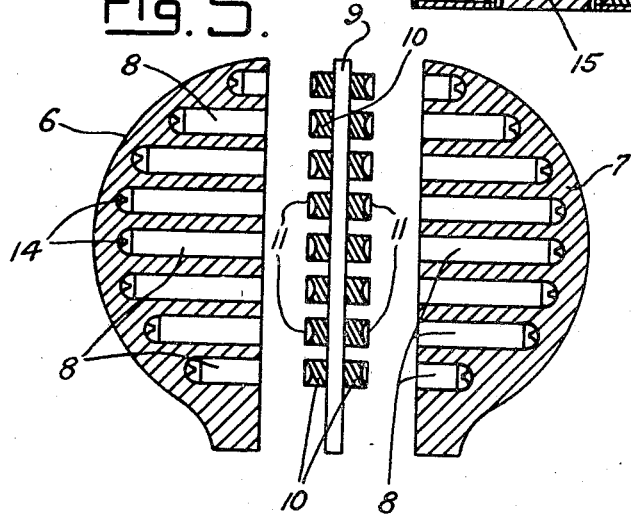
Figure 5, shows in section the three parts forming the core of the tire as illustrated in Figure 4 and before being vulcanized together.
Figure 2:
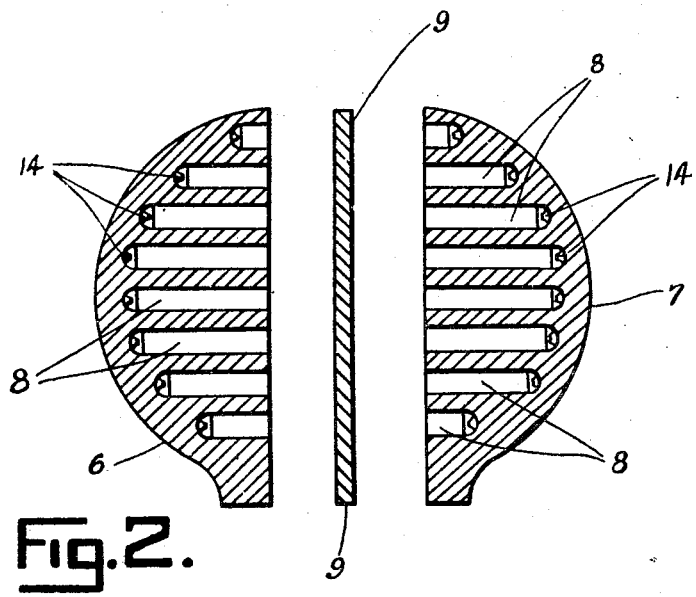
Figure 3:
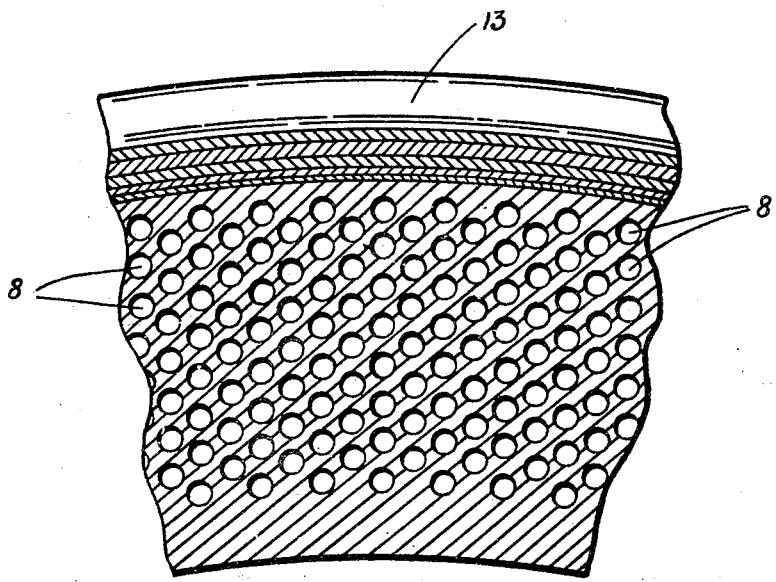
Figure 3 is a longitudinal section through a portion of the complete core and outer casing.

In the preferred modification the outer ends of the cylindrical recesses 8 are provided with a wad of unvulcanizable rubber 14 as illustrated in Figures 4 and 5, which allows a hypodermic needle to be inserted into successive cells and air forced or injected therein, such air being prevented from escaping or sealed by the wad 14.

I claim:

1. In the manufacture of tires for motor vehicles, forming a semi-vulcanized rubber core into two similar annular parts or halves, each of said halves having recesses or cells coinciding with recesses or cells in the opposed half and positioned transversely of the tread and in staggered relation in plan, placing a division member having lateral pins between the annular parts with the lateral pins adapted to partly enter the opposed recesses in the halves, confining or passing air or gas into said cells, and vulcanizing the halves of the cores and the division members and pins together.

2. In the manufacture of tires for motor vehicles forming a semi-vulcanized rubber core in two similar annular parts or halves, said halves having recesses or cells coinciding with recesses or cells in the opposed half and positioned transversely of the tread and in staggered relation in plan, interposing a division piece or member between the inner faces of the halves, confining or passing air or gas in to the cells and vulcanizing the halves and division member together.

In testimony whereof I have hereunto set my hand.

ERNEST HIBBERT.